United States Patent [19]
Dell

[11] 3,725,575
[45] Apr. 3, 1973

[54] IMAGE TRANSFER DEVICE

[75] Inventor: Brian E. Dell, Newton, Conn.
[73] Assignee: Computer Optics, Inc., Bethel, Conn.

[22] Filed: May 1, 1970
[21] Appl. No.: 33,650

[52] U.S. Cl. ............178/6.7 R, 340/324 A, 346/110
[51] Int. Cl. ............H04n 5/84
[58] Field of Search ....178/6.7 A, 7.2 D, 7.4, DIG. 1, 178/6.7 R; 346/110

[56] References Cited

UNITED STATES PATENTS

| | | | |
|---|---|---|---|
| 2,839,602 | 6/1958 | Fries | 178/6.7 A |
| 2,750,442 | 6/1956 | Bedford | 178/7.2 D |
| 2,890,277 | 6/1959 | Duke | 178/7.2 D |
| 3,225,137 | 12/1965 | Johnson | 178/6.7 A |
| 3,401,232 | 9/1968 | Goldhammer et al. | 178/DIG. 1 |
| 3,482,255 | 12/1969 | Baker et al | 178/6.7 R |
| 3,590,150 | 6/1971 | McMahon | 178/6.7 R |

*Primary Examiner*—James W. Moffit
*Attorney*—Morgan, Finnegan, Durham & Pine

[57] ABSTRACT

An image transfer device for the transfering of a video image from a video image generating device to a sensitized medium. By synchronizing the generation of the video image to the movement of the sensitized medium, a continuous transfering mechanism is created.

5 Claims, 6 Drawing Figures

INVENTOR.
BRIAN E. DELL

BY

Morgan, Finnegan, Durham & Pine
ATTORNEYS

INVENTOR.
BRIAN E. DELL
BY
Morgan, Finnegan, Durham & Pine
ATTORNEYS

INVENTOR.
BRIAN E. DELL
BY
Morgan, Finnegan, Durham & Pine
ATTORNEYS

INVENTOR.
BRIAN E. DELL
BY
Morgan, Finnegan, Durham & Pine
ATTORNEYS

INVENTOR.
BRIAN E. DELL
BY
Morgan, Finnegan, Durham & Pine
ATTORNEYS

IMAGE TRANSFER DEVICE

BACKGROUND OF THE INVENTION

This invention relates generally to a system permitting transfer of images between a video image device and a permanent image. Although not limited thereto, the invention is particularly useful in transferring a video image as may appear at a computer terminal display to a photo-sensitive paper to thereby provide a permanent copy of the momentary video display.

An example of a video type computer terminal is disclosed in copending applications Ser. No. 806,624 and now U.S. Pat. No. 3,671,956 entitled "Display System" and Ser. No. 806,455 and now U.S. Pat. No. 3,671,957 entitled "Character Generation Display System, both applications having been filed Mar. 12, 1969 in the names of Thomas D. Kegelman and Peter R. Williams and having a common assignee with this application.

These computer terminals are usually remotely located relative to the main computer assembly and are generally coupled to the computer via telephone lines so that data can be fed to the computer or received from the computer and visually displayed at the terminal. An inventory system is a typical computer terminal use. A salesman, for example, when in the process of completing an order may wish to make sure that an adequate inventory exists to fill the order. By means of a keyboard at the remote terminal the salesman would interrogate the central computer and a message would be set back and displayed as a video image at the terminal giving a description of the articles, their location, quantity in stock, quantity on order, quantity of units committed but not yet shipped, etc.

The salesman may also wish to send data to the central computer concerning a recent sale to update the inventory data. This would be accomplished at the computer terminal by composing a message on the video display via the keyboard setting forth the customer's name, a description of the goods and the quantity ordered. When the message is completed it would be electronically transfered to the central computer.

The video type computer terminals are excellent in providing for the rapid callup of information from the central computer and for the convenient transmission of messages to the central computer. In many cases however it is also desirable to have a system available at the terminal for producing permanent copies of the information. The salesman, for example, may desire a permanent copy confirming a sales order entered via the computer terminal or he may desire a permanent copy of the inventory data for later study.

In the past some computer terminal installations have included systems for producing permanent copies which are completely separate from the video display system. Aside from the added cost of two separate systems at the computer terminal, this approach is undesirable because of the existing possibility of a discrepancy between the video image and the permanent copy.

Other prior systems have sought to transfer the video image to photo-sensitive paper to produce a permanent copy by incrementally moving the copy medium relative to a stationary video image. More specifically, a section of the copy medium would be positioned relative to the video screen and a section of the message, for example a text line, would be displayed in a stationary manner for a period of time sufficient to expose the copy medium. The copy medium would then move one increment and another section of the message would be composed and displayed to expose the photosensitive copy medium. Thus, by incremental movement of the copy medium and by creating sections of the message in successive stationary displays, a copy of the entire message could be formed. This approach has several drawbacks, namely, the need for a cumbersome mechanical mechanism creating the incremental movement, the need for special electronics for creating the video display on a section by section basis, and the distortion and noise displayed between separate sections of the display.

An object of this invention is to provide a system for transfering images between a video display and a permanent copy without the need for incremental movement of the permanent copy medium.

Another object is to provide a system for producing permanent copies which is compatible with a video image computer terminal and which requires a minimum duplication of electronic circuitry and a minimum of accessory electronics at the computer terminal.

SUMMARY OF THE INVENTION

In accordance with the invention, when used at a computer terminal to produce permanent copies, a photo-sensitive copy medium moves past the video screen in a continuous motion. The video image is produced in the usual fashion but the vertical deflection signal is modified so that the video image moves in synchronism with the movement of the copy medium. As the copy medium moves across the video screen, the copy medium and the video image are locked in synchronous movement for a sufficient period of time to fully expose the copy medium and thereby transfer the image.

The desired movement of the video image is achieved by intentionally misaligning the vertical deflection signal relative to the normal horizontal deflection and intensity control signals. The vertical deflection signal is displaced in time by a delay period controlled according to the position of the copy medium. Assuming that the copy medium moves from bottom to top across the video screen, as the leading edge of the copy medium (top of the copy being produced) begins to cross the video screen, the time delay or misalignment of the vertical deflection signal is at a maximum so that the upper portion of the video image appears at the bottom of the screen. As the copy medium moves upwardly across the screen, the time delay or misalignment of the vertical deflection signal gradually decreases and therefore the video image moves upwardly in synchronism with the movement of the paper across the screen.

In a full screen image display there are bound to be some distortions in the visual image, particularly near the outer edges of the display. Although the system according to the invention could be operated on a full screen basis i.e. by producing the full screen video image and by moving the full image across the screen in contact with the copy medium, a sharper copy can be produced by means of a thin window display which largely eliminates the effects of distortions in the image. In other words, it is preferable to electronically mask out the upper and lower portions of the video image so that the video image appears to roll past a thin window extending across the center of the screen.

Not only does the thin window approach provide a sharper copy by minimizing the effects of image distortions, but there are cost advantages as well. A fiber optics bundle is used to reduce the scattering of the phosphor generated light as it passes through the relatively thick glass of the image screen. Since fiber optics components are relatively expensive, a considerable cost saving is achieved through use of a thin window display and a relatively small fiber optics bundle. Also, a substantial current is required for deflection of the electron beam toward the upper and lower portions of the screen. These current requirements are largely eliminated by the thin window approach when the video image is located only near the vertical center of the screen.

DETAILED DESCRIPTION OF A PREFERRED EMBODIMENT

Figure 1:
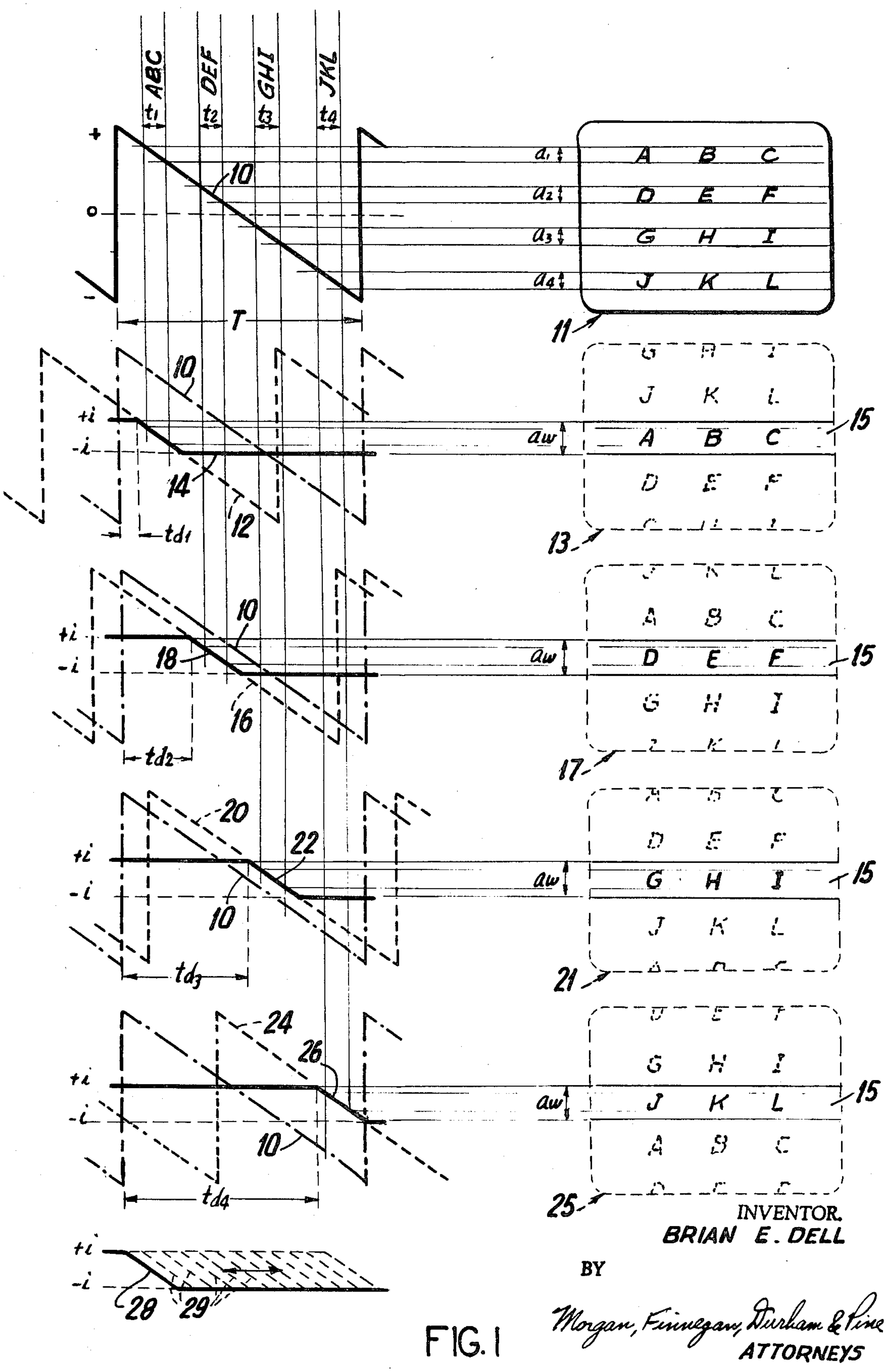
FIG. 1 illustrates a sequence of views of the faceplate of a cathode-ray tube portraying the movement of a video image across the faceplate of the tube in accordance with the invention and the associated waveforms for generating the images.

FIG. 1 illustrates the manner in which the vertical sweep signal is intentionally misaligned or time delayed to shift the video image to the desired location on the screen and the manner in which the sweep signal is limited so that the video image appears only within a thin window.

The normal video image would be formed by the video sweep signal 10. Using standard television frequencies, the period T of the sweep signal would be one-thirtieth second and, hence, the sweep signal would repeat 30 times per second. Assume that the video image 11 consists of four text lines including the letters A–L as shown. Under these circumstances, the horizontal sweep and beam intensity signals for the letters A B C of the first text line occur early within the period T during the time interval $t_1$. Because of the magnitude of the vertical sweep signal 10 during the time interval $t_1$, the letters A B C appear in the area $a_1$ in the upper portion of the video image 11. Likewise, the horizontal sweep and intensity control signals for the letters D E F occur during time interval $t_2$ and because of the magnitude of the vertical sweep signal 10 during this time interval the letters D E F appear in the video image in area $a_2$. Similarly the signals for the letters G H I and J K L occur during time intervals $t_3$ and $t_4$, respectively, and the letters appear in areas $a_3$ and $a_4$.

If the horizontal sweep signals and the beam intensity control signals remain unchanged, but the vertical sweep signal is shifted in time to form vertical sweep signal 12 (shown in dotted lines), a video image 13 results. Note that the video image has shifted position so that the letters A B C instead of appearing at the top of the image are now located approximately in the middle because the magnitude of the vertical sweep signal 12 during the time interval $t_1$ now corresponds to the midpoint location on the video screen.

If the vertical sweep signal is further modified to form vertical sweep signal 14 (shown in heavy line) limited between $+i$ and $-i$, only the letters A B C will appear in the video image in a thin window 15 in center area $a_w$ of the image. The remainder of the video image, i.e. letters D through L, would no longer be visible but instead would pile up on the lines along the upper and lower edges of window 15.

Similarly, if the vertical sweep signal is shifted to form sweep signal 16, the video image 17 results and if the signal is further modified to form vertical sweep signal 18, limited between the values $+i$ and $-i$, only the letters D E F appear in window 15. In this case the values of the vertical sweep signal 18 which form the center portion of the image occur during the time interval $t_2$ while the horizontal sweep and beam intensity control signals are forming the letters D E F. In like fashion, vertical sweep signal 22 causes the letters G H I to appear in window 15 and vertical sweep signal 26 causes the letters J K L to appear in window 15.

In comparing the progression of video images 13, 17, 21 and 25, it should be observed that first the upper portion, that is the letters A B C of the normal video image 11, appears in window 15, then a lower portion including the letters D E F appears in the window, then a still lower portion including the letters G H I appears in the window, and then finally the bottom portion including the letters J K L appears in the window. In comparing the progression of vertical sweep signals 14, 18, 22 and 26, it should be observed that a relatively small time delay $t_{d_1}$ in the commencement of the ramp portion of sweep signal 14 causes the upper portion of the image including letters A B C to appear in the window and increasingly larger time delays $t_{d_2}$, $t_{d_3}$ and $t_{d_4}$ cause increasingly lower sections of the image i. e. the letters D E F, G H I, and J K L, respectively, to appear in the window. Therefore, a gradual continuous increasing of the time delay $t_d$ causes a corresponding movement of the video image so that the normal video image appears to roll past the window. Thus, if commencement of the ramp portion of sweep signal 28 is increasingly delayed, as indicated by the dotted lines, a continuous movement of the video image is achieved.

Figure 2:
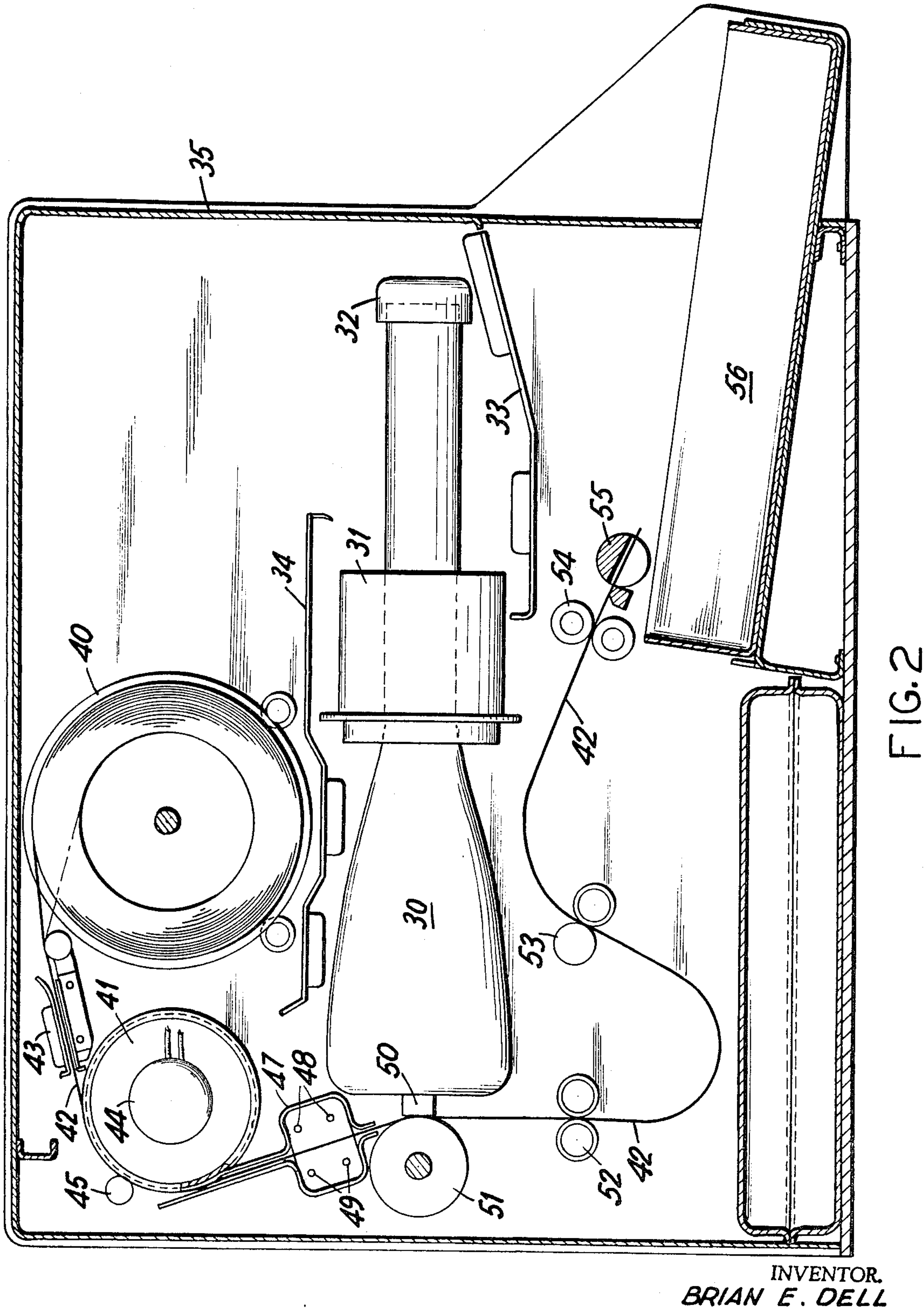
FIG. 2 is a sectional side elevational view of the apparatus of the present invention illustrating the movement of the sensitized medium across the faceplate of a cathode-ray tube which incorporates a fiber optics bundle into its design.
Figure 3:
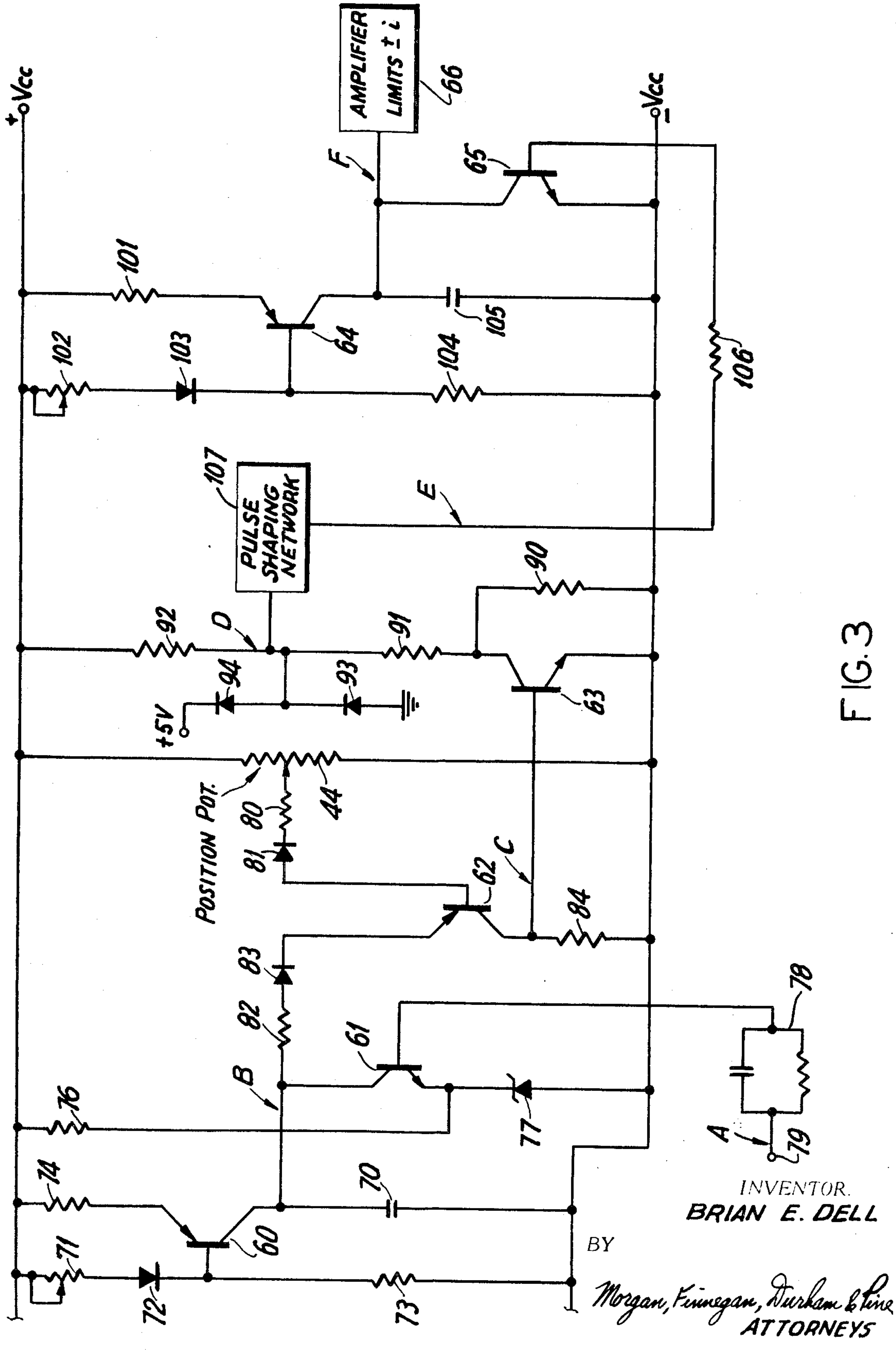
FIG. 3 is an electrical schematic diagram of the circuitry employed to synchronize the movement of the video image across the face of a cathode-ray tube with the movement of the sensitized medium.

FIG. 2 illustrates the mechanical portion of the system showing a web transport which advances the copy medium past the cathode-ray tube (CRT) which forms the video image. FIG. 2 also shows the potentiometer which developes an electrical position signal indicating the instantaneous position of the copy medium. FIG. 3 is a schematic diagram illustrating the electrical circuits which generate vertical sweep signals such as sweep signals 14, 18, 22 and 26 (FIG. 1) having a time delay of the ramp portion which is proportional to the magnitude of the position signal. The interrelationship of the time delay in the sweep signal with the instantaneous position signal, maintains the video image in synchronism with the movement of the copy medium or, in other words, the movement of the video image is controlled so that it precisely follows the movement of the copy medium.

Referring specifically to FIG. 2, the cathode-ray tube (CRT) 30 is mounted within an enclosure 35. The CRT is preferably of a configuration providing a screen width greater than the normal 8 inch paper width. The height of the screen however need not be more than a few inches, i.e., sufficient to produce the window portion of the video image. Control over the electron beam deflection is achieved through a conventional deflection yoke 31 mounted surrounding the neck of the CRT and connections to the beam control grid, heater supplies and focusing grids is achieved through connection of end cap 32 at the end of the CRT. Shields 34 and 33 are placed above and below CRT 10 to preclude inadvertent contact by the operators of the apparatus.

A supply roller 40 located above the CRT provides a continuous web 42 of photo-sensitive paper upon which the permanent image is to be produced. A suitable medium is a paper coated with a photoconductor such as zinc oxide (ZnO). A uniform negative charge can be placed upon the ZnO surface by a corona discharge. The charged surface can then be exposed to a light pattern corresponding to the image being produced. The negative charge leaks off that portion of the surface exposed to light thereby leaving a latent electrostatic charge image on the paper. A permanent image is thereafter produced by passing the paper through a toner so that charged particles will cling to the paper according to the electrostatic charge pattern and thereafter fixing the toner by heating.

The web of paper 42 passes from supply roller 40 through a guide 43 and around a metering drum 41. A pressure roller 45 is urged toward drum 41 to maintain the paper in a non-sliding engagement with the surface of the metering drum which is preferably coated with rubber or some other high coefficient of friction material. A potentiometer 44 is mounted so that the potentiometer shaft is directly coupled for rotation with the metering drum.

Potentiometer 44 is used to develop the electrical signal indicating the position of the paper and should be of a linear resistance type. Thus, as the paper advances, thereby rotating the metering drum, the shaft of the potentiometer will also rotate and the resistance will increase linearly in accordance with the angular rotation of the metering drum. If the system is designed to produce copy in sheet form, the circumference of the metering drum should be equal to the sheet length, and the potentiometer should be positioned so that the transition from maximum to minimum resistance occurs when the point on the web between successive copy sheets is located in front of the CRT. With this arrangement the resistance of potentiometer 44 will be minimum as the beginning of the sheet (top of the sheet) passes the CRT and will increase toward a maximum value as the end of the sheet approaches. As will be explained hereinafter, a minimum resistance provides the minimum time delay and therefore the top of the video image appears first on the CRT. As the sheet advances and the resistance increases, the time delay in the sweep signal increases and therefore successively lower portions of the video image appear on the CRT as lower portions of the sheet pass the CRT. Because of the direction of movement, the video image is inverted so that the characters appear upside down.

After passing metering drum 41, the paper passes through a corona discharge chamber 47 between electrodes 48 and 49 which places a negative charge on the zinc oxide surface of the paper.

Upon emerging from the corona discharge chamber, the charged paper passes in front of CRT 30 where the latent electrostatic image is formed. A fiber optics bundle is located between the paper and the screen of the CRT. A pressure roller 51 maintains the paper in engagement with the fiber optics bundle.

The purpose of fiber optics bundle 50 is to provide a crisp image. When light is generated by activation of the phosphors on the inner surface of the CRT screen, the light has a tendency to scatter as it passes through the relatively thick glass of the screen. The parallel fibers of the fiber optic bundle only accept the light traveling in the direction of the fiber axis and, hence, most of the scattered light is rejected. The result is a crisp image at the end of the bundle which engages the paper. The fiber optic bundle is secured to the outer surface of the screen and is dimensioned approximately in accordance with the size of the image window.

After the paper is exposed while passing in front of the CRT it passes through guide rollers 52, 53 and 54 and through the toner and heaters (not shown) to provide a permanent image on the paper according to the latent electrostatic image. A cutter 55 cuts the web into sheets which are then deposited in a tray 56.

The transport speed, i.e. the speed at which the web moves, is selected to provide an adequate exposure interval during which the paper is in front of the CRT in contact with the fiber optics bundle. It is essential that the exposure interval include at least the formation of one complete frame of the video image to make sure that the desired portion of the video image is formed during the exposure interval. Normally, the exposure interval should be several times greater than the period T (FIG. 1) during which a frame of the video image is formed but this is determined according to the light produced by the CRT and the sensitivity of paper and is selected to achieve a complete exposure of the copy medium.

As previously mentioned, FIG. 3 shows the circuits for generating the modified vertical sweep signals 14, 18, 24 and 26 (FIG. 1) having a time delay of the ramp portion which is proportional to the magnitude of a position signal. Transistors 60–63 in FIG. 3 develop a time delay proportional to the magnitude of the position signal developed via potentiometer 44. Transistors 64 and 65 provide a delayed ramp signal in accordance with the time delay which passes through a limit amplifier 66 to produce the modified vertical sweep signal.

PNP type transistor 60 is part of a constant current circuit which provides charging current for a capacitor 70. A variable resistor 71, a diode 72 and a resistor 73 are connected in series to form a voltage divider with the junction between diode 72 and resistor 73 connected to the base of transistor 60. The emitter of the transistor is coupled to +Vcc via a resistor 74 and the collector is coupled to −Vcc via capacitor 70.

The potential drop across the emitter base junction of transistor 60 is approximately equal to the potential drop across diode 72 and therefore the transistor maintains the current flow through the collector-emitter circuit at a constant value which establishes a potential drop across resistor 74 approximately equal to the potential drop across variable resistance 71. The constant current is used to charge capacitor 70 in a substantially linear fashion.

An NPN transistor 61 is used to periodically discharge capacitor 70. The collector of the transistor is directly connected to one plate of the capacitor and the emitter is connected to the other plate of the capacitor via a Zener diode 77. A terminal 79 is coupled to the base of the transistor via coupling network 78. A resistor 76 is connected in series with Zener diode 77 between +Vcc and −Vcc to provide current flow through the diode which in turn maintains a fixed potential at the emitter of transistor 61.

Figure 4:
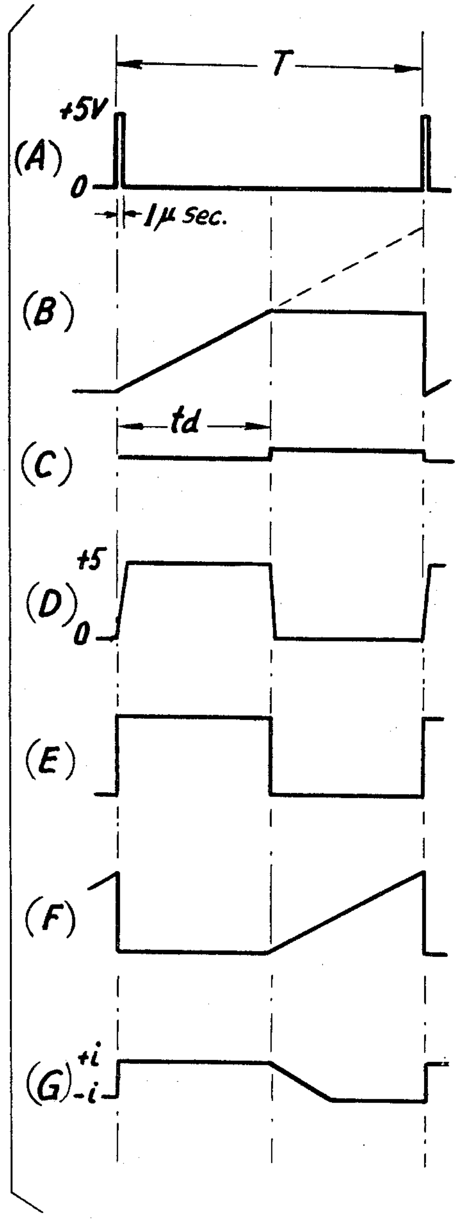
FIG. 4 illustrates a series of waveforms that appear at points A through F in FIG. 3.

The signal applied to terminal 79 is waveform A shown in FIG. 4. This signal originates from the clock which controls the various sweep and intensity control circuits of the normal video display. The successive pulses correspond to the commencement of each successive ramp of the normal vertical sweep and, hence, the period between successive pulses is the period T (see also FIG. 1).

When the positive pulse of waveform A is applied to terminal 79, transistor 61 is rendered conductive to rapidly discharge capacitor 70. After termination of the pulse, transistor 61 returns to the nonconductive state and a charge builds up across capacitor 70 at a rate controlled by variable resistor 71. The result is a ramp signal at point B (see waveform B in FIG. 4) which is approximately the same as the normal vertical sweep signal 10 (FIG. 1).

A PNP transistor 62 is part of a comparator circuit which compares the potential at the tap of position potentiometer 44 with the potential at point B. The ends of the position potentiometer are connected to +Vcc and −Vcc. The variable tap, which is positioned according to the position of the copy medium, is coupled to the base of transistor 62 via a resistor 80 in series with a diode 81. Point B is connected to the emitter of transistor 62 via a resistor 82 in series with a diode 83. The collector is coupled to −Vcc via a resistor 84.

As long as the potential at point B is less than the potential at the variable tap of position potentiometer 44, the emitter-base junction of transistor 62 is back biased and the transistor is nonconductive. However, when the potential at point B exceeds the potential at the variable tap by an amount sufficient to overcome the emitter-base threshold potential of the transistor plus the conduction threshold of diodes 83 and 81, transistor 62 becomes conductive. The result is a rise in the potential at the collector of transistor 62. The signal at the collector of transistor 62 is waveform C in FIG. 4.

The point in time during the period T when transistor 62 becomes conductive depends upon the potential at the variable tap of potentiometer 44 which in turn depends upon the position of the copy medium. If the potential is low, transistor 62 will become conductive early in the period whereas if the potential is higher transistor 62 will become conductive later in the period. The time interval $t_d$ (FIG. 4) required for transistor 62 to become conductive is a time interval which is proportional to the potential at the variable tap of potentiometer 44.

An NPN transistor 63 amplifies the signal appearing at point C. The collector of transistor 62 is connected to the base of transistor 63 and the emitter is connected to −Vcc. The collector is coupled to −Vcc via a resistor 90 is also coupled to +Vcc via the series resistors 91 and 92. Diodes 93 and 94 are connected in series between ground and a +5 volt source with the junction between the diodes connected to the junction D between resistors 91 and 92. Waveform D (FIG. 4) appearing at point D (FIG. 3) is the same as that at point C except that it is inverted, amplified and limited between the values of zero and +5 volts.

PNP transistor 64 together with related components 101–104 forms a constant current circuit essentially the same as that formed by transistor 60 and related components 71–74. Transistor 64 therefore provides a constant charging current for capacitor 105 controlled by variable resistor 102.

NPN transistor 65 is used to discharge capacitor 105 and maintain the capacitor in the discharged state until the desired commencement of the ramp portion of the vertical sweep signal. The collector-emitter circuit is connected directly across capacitor 105 and point D is connected to the base of the transistor via a pulse shaping network 107 and a resistor 106.

During interval $t_d$ a positive signal is applied to the base of transistor 65 and therefore the transistor is conductive and maintains capacitor 105 in the discharged state. However, at the end of time interval $t_d$ the base potential of transistor 65 drops and the transistor becomes nonconductive. As a result, capacitor 105 charges to provide a time delayed ramp signal at point F as shown in FIG. 4. This signal is supplied to amplifier 66 which provides a corresponding output signal (wave-form G FIG. 4) limited between the values $+i$ and $-i$.

Figure 6:
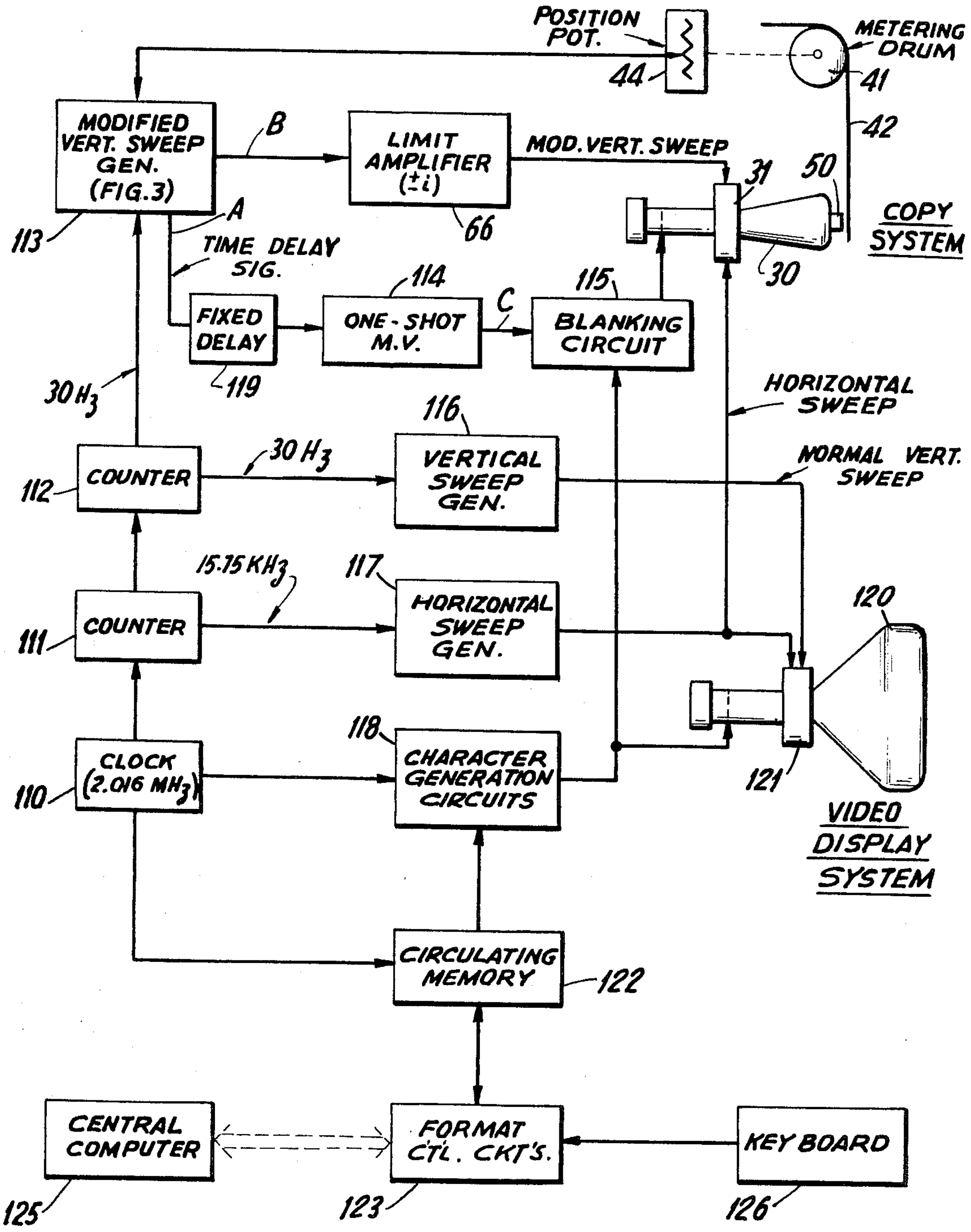
FIG. 6 is a block diagram illustrating the copying system of the present invention incorporated into a data handling system that utilizes remote terminal stations.

FIG. 6 is a block diagram of a complete computer terminal including CRT 30 which is part of the system for producing permanent copies and another CRT 120 is part of the system for producing the video display. The block diagram illustrates the compatibility between the two systems and the extent to which the same circuitry can be used in both systems. Details of the video display system are more fully set forth in the aforementioned copending applications Ser. Nos. 806,624 and 806,455.

Circulating memory 122 is designed with sufficient capacity to store all the information required for a complete frame of the video display. A complete frame may include several thousand character slots and the character in each slot is designated in eight bit alphanumeric code. The format control circuits 123 can receive data locally from a keyboard 126 and operate to place the characters in the proper character slots according to the format being used. Incoming data can also be received from the central computer 125, usually via telephone lines. The format control circuits organize the incoming data and insert the individual character designations of an incoming message into the proper character slots.

Format control circuits 123 also serve to transfer data from the computer terminal to the central computer by taking the data in circulating memory 122 and organizing it in a fashion suitable for transmission and receipt by the central computer.

Since circulating memory 122 stores the character designations for the entire video framedisplay, selected portions of the data can be extracted as needed by character generation circuits 118. For example, while scanning the area of the first test line of the video display, it is only necessary to generate the characters of the first test line into signals which produce the characters on the video screen. Thus, coded data is extracted from the circulating memory on a line by line basis and converted into a video display accordingly with the entire process being repeated during the scanning of each display frame.

Clock 110 is a crystal controlled pulse generator operating at 2.016 megahertz which provides precise timing control of all operations at the computer terminal. The clock frequency corresponds to the rate at which the horizontal scan passes through successive character slots of the video display. Thus, the clock is used to control transfer of data from the circulating memory to character generation circuits 118 and is used to control the generation of control signals by circuit 118 for the formation of the characters of the video display.

Clock 110 also controls the timing of the horizontal and vertical sweep signals. A counter 111 reduces the frequency to obtain a 15.75 KHz pulse train which triggers generation of successive horizontal sweeps by circuit 117. Counter 112 further reduces the frequency of the pulse train to 30 Hz for triggering operation of the vertical sweep circuits 116.

Circuits 116 and 117, respectively, control the vertical and horizontal deflection coils in yoke 121 surrounding the neck of CRT 120 and circuits 118 control the electron beam intensity to obtain an alphanumeric video display on the screen of CRT 120.

The same character generation signals and horizontal sweep signals provided by circuits 118 and 117, respectively, are used to control CRT 30 in the copy system. Also, the pulse train developed by counter 112 is supplied to circuit 113 (Signal A in FIG. 4; applied to terminal 79 in FIG. 3). As previously described, circuit 113 provides a vertical sweep signal delayed relative to the normal sweep signal by an amount depending upon the position of the copy medium as indicated by position potentiometer 44. Limit amplifier 66 amplifies the delayed sweep signal and limits the vertical sweep signal to the range between plus and minus (i) corresponding to the thin window display.

As previously mentioned in connection with FIG. 1, the modified vertical sweep signal will normally cause the portion of the video display outside the window 15 to pile up along lines above and below the window. These lines can be eliminated by means of blanking circuit 115 which acts as a gate and blocks the beam intensity control signal from circuit 118 except during the ramp portion of the modified sweep signal.

The time delay signal developed by circuit 113 passes through a fixed time delay circuit 119 to activate a one-shot multivibrator circuit 114. Once activated, circuit 114 remains activated for a fixed period of time to produce a gating pulse for circuit 115 which determines the period of time during which signals are permitted to pass through to CRT 30.

Figure 5:
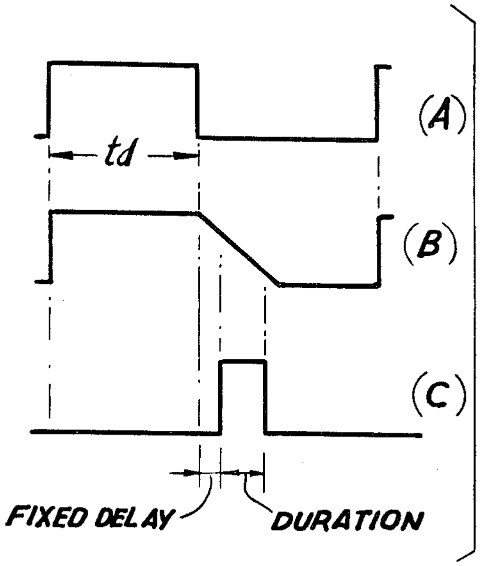
FIG. 5 illustrates graphically a blanking technique whereby a signal is generated so as to electrically mask the video image produced on the cathode-ray tube so that only that portion of the tube employing the fiber optics bundle has the video image applied to it.

The time relationship of the gating pulse (point C) at the output of circuit 114 to the modified vertical sweep (point B) and the time delay signal (point A) is shown in FIG. 5 which shows the respective waveforms at these three points. Waveform A in FIG. 5 is the same as waveform E in FIG. 4. This waveform includes the time delay $t_d$ which controls initiation of the ramp portion of the modified vertical sweep shown as waveform B in FIG. 5. Fixed time delay circuit 119 provides the "fixed delay" shown in waveform C in FIG. 5 and one-shot circuit 114 controls the "duration" of the gating pulse. Thus, the gating pulse permits control signals to reach CRT 30 via circuit 115 only during a part of the ramp portion of the modified vertical sweep. The pile up of images above and below the window occurs during the constant level portion of the modified sweep signal and are eliminated by the blanking circuit.

The foregoing description has assumed the simplest type of vertical sweep signal for the normal video display but the invention is equally as useful in systems involving more complex vertical sweep arrangements such as those described in the aforementioned copending applications. For example, if the video image is produced using an interlaced scanning pattern wherein two vertical sweeps are required to complete a single image frame, the same movement of the video image is achieved by modifying each of the vertical sweep signals in the fashion illustrated in FIG. 1. As another example, if other signals are superimposed upon the normal linear sweep to vary the separation between successive horizontal traces, the same signals would be superimposed upon the modified vertical sweep signal to achieve a comparable moving video display.

Although only one illustrative embodiment has been described in detail, it should be obvious that there are other embodiments and uses within the scope of the invention. For example, other copy mediums such as microfilm can be used; by incorporating the flying spot scanner technique the system could read permanent copies to produce corresponding electrical signals; by composing messages on a line by line basis copies of any desired length can be produced; and by modifying the horizontal sweep instead of the vertical sweep other directions of movement can be achieved. The invention is more particularly defined in the appended claims.

I claim:

1. Apparatus for providing a permanent copy from a video image comprising:

a cathode ray tube;

a transport mechanism for moving a sensitized copy medium across the face of said cathode ray tube;

position sensing means coupled to said transport mechanism to sense the position of said copy medium and provide an electrical signal indicative of said position;

raster scanning signal generating circuits for generating an intensity control signal a vertical sweep signal, and a horizontal sweep signal;

coupling circuit means connected between said signal generating circuits and said cathode ray tube to apply said intensity control signal and said horizontal sweep signal to said cathode ray tube;

and variable time delay circuit means connected to said signal generating circuits and said cathode ray tube and responsive to said position indicative signal to shift said vertical sweep signal in time by amounts corresponding to different segments of the video image to be recorded on said copy medium, and to supply said shifted vertical sweep signal to said cathode ray tube so as to present the portion of said raster containing the selected video image segment at at least one desired position on said cathode ray tube.

2. Apparatus according to claim 1 further including signal limiting means connected between said time delay circuit means and said cathode ray tube to limit the magnitude of said vertical sweep signal to provide a thin window display presenting only the selected segment of the video image.

3. Apparatus according to claim 2 further including blanking circuit means connected between said signal generating means and said cathode ray tube to blank said intensity control signal during the time in which said vertical sweep signal is being limited.

4. Apparatus according to claim 1 further comprising a fiber optics bundle between the face of said cathode ray tube and the sensitized copy medium.

5. A computer terminal comprising:

a memory for storing information for a video display;

a clock for providing timing signals;

video display signal generating circuits connected to said clock and said memory including a vertical sweep generator for providing a vertical sweep signal a horizontal sweep generator for providing a horizontal sweep signal, and character generation circuits for providing a synchronized intensity control signal according to the video display stored in said memory;

a video display cathode ray tube;

coupling circuit means connected between said signal generating circuits and said video display cathode ray tube to apply said vertical sweep signal, said horizontal sweep signal and said intensity control signal to said video display cathode ray tube;

a second cathode ray tube;

a transport mechanism for moving a sensitized copy medium across the face of said second cathode ray tube;

position sensing means coupled to said transport mechanism to sense the position of said copy medium and provide an electrical signal indicative of said position;

coupling circuit means connected between said signal generating circuits and said second cathode ray tube to apply said intensity control signal and said horizontal sweep signal to said second cathode ray tube; and variable time delay circuit means connected to said signal generating circuits and said second cathode ray tube and responsive to said position indicating signal to shift said vertical sweep signal in time by amounts corresponding to different segments of the video image to be recorded on said copy medium, and to apply said shifted vertical sweep signal to said second cathode ray tube so as to present the portion of said raster containing the selected video image segment at at least one desired position on said cathode ray tube.

* * * * *